(12) United States Patent  
Strackbein et al.

(10) Patent No.: US 7,791,863 B2
(45) Date of Patent: Sep. 7, 2010

(54) SWITCHGEAR CABINET ASSEMBLY OR RACK ASSEMBLY

(75) Inventors: Heinrich Strackbein, Biebertal (DE); Ralf Dahmer, Olpe (DE); Markus Hain, Dillenburg (DE); Jörg Kreiling, Biebertal (DE); Hartmut Lohrey, Hungen (DE)

(73) Assignee: Rittal GmbH & Co. KG, Herborn (DE)

( * ) Notice: Subject to any disclaimer, the term of this patent is extended or adjusted under 35 U.S.C. 154(b) by 34 days.

(21) Appl. No.: 11/886,510

(22) PCT Filed: Mar. 17, 2005

(86) PCT No.: PCT/EP2005/002857

§ 371 (c)(1),
(2), (4) Date: Jul. 25, 2008

(87) PCT Pub. No.: WO2006/079127

PCT Pub. Date: Sep. 21, 2006

(65) Prior Publication Data

US 2009/0116174 A1 May 7, 2009

(51) Int. Cl.
H02B 1/26 (2006.01)
(52) U.S. Cl. ........................................ 361/622; 361/624
(58) Field of Classification Search ................. 361/622
See application file for complete search history.

(56) References Cited

U.S. PATENT DOCUMENTS

| | | | | |
|---|---|---|---|---|
| 5,821,636 A * | 10/1998 | Baker et al. | ................. | 307/70 |
| 5,934,096 A | 8/1999 | Munson et al. | | |
| 6,069,797 A * | 5/2000 | Widmayer et al. | .......... | 361/760 |
| 6,348,745 B1 * | 2/2002 | Laurosch et al. | ............. | 307/112 |
| 6,522,542 B1 * | 2/2003 | Gordon et al. | ............... | 361/704 |
| 6,628,009 B1 | 9/2003 | Chapel | | |
| 6,826,036 B2 * | 11/2004 | Pereira | ..................... | 361/624 |
| 6,882,530 B2 * | 4/2005 | Cyphers et al. | ............. | 361/829 |
| 6,917,289 B2 | 7/2005 | Laurösch et al. | | |
| 7,116,550 B2 * | 10/2006 | Ewing et al. | ................. | 361/623 |
| 7,324,006 B2 * | 1/2008 | Godard | ........................ | 340/664 |
| 7,365,964 B2 * | 4/2008 | Donahue, IV | ............... | 361/622 |
| 7,522,036 B1 * | 4/2009 | Preuss et al. | ................. | 340/531 |

(Continued)

FOREIGN PATENT DOCUMENTS

DE 25 15 152 10/1976

(Continued)

Primary Examiner—Gregory D Thompson
(74) Attorney, Agent, or Firm—Pauley Petersen & Erickson

(57) ABSTRACT

A switchgear cabinet assembly or rack assembly including an electric supply device that can be or is connected to a primary power supply. Equipment that is housed in at least one switchgear cabinet or rack on the user side, or equipment that is to be supplied with electricity can be or is connected to the electric supply device. To achieve simple and reliable connection options, a sub-distribution device is located in the switchgear cabinet or rack or in a separate cabinet or rack. The device has at least one sub-distribution unit that can be or is connected to the primary power supply, having a housing or frame and being retained and secured by a mounting unit. According to this invention, the sub-distribution unit can be or is connected to primary supply lines that lead to the primary power supply and to pre-fabricated connection lines that lead to the rack.

19 Claims, 11 Drawing Sheets

U.S. PATENT DOCUMENTS

| | | |
|---|---|---|
| 7,567,430 B2 * | 7/2009 | Ewing et al. ................. 361/623 |
| 2002/0070610 A1 | 6/2002 | Bersiek |
| 2003/0062183 A1 * | 4/2003 | Schomaker et al. ........... 174/50 |
| 2004/0189161 A1 * | 9/2004 | Davis et al. .............. 312/265.3 |
| 2005/0082239 A1 | 4/2005 | Laurösch et al. |

FOREIGN PATENT DOCUMENTS

| | | |
|---|---|---|
| DE | 42 10 657 A1 | 10/1993 |
| DE | 298 13 657 U1 | 11/1998 |
| DE | 297 16 201 U1 | 2/1999 |
| DE | 198 26 453 C2 | 12/1999 |
| DE | 199 11 196 A1 | 9/2000 |
| DE | 101 08 599 C2 | 9/2002 |
| DE | 101 60 418 C1 | 2/2003 |
| FR | 2 467 498 | 4/1981 |

* cited by examiner

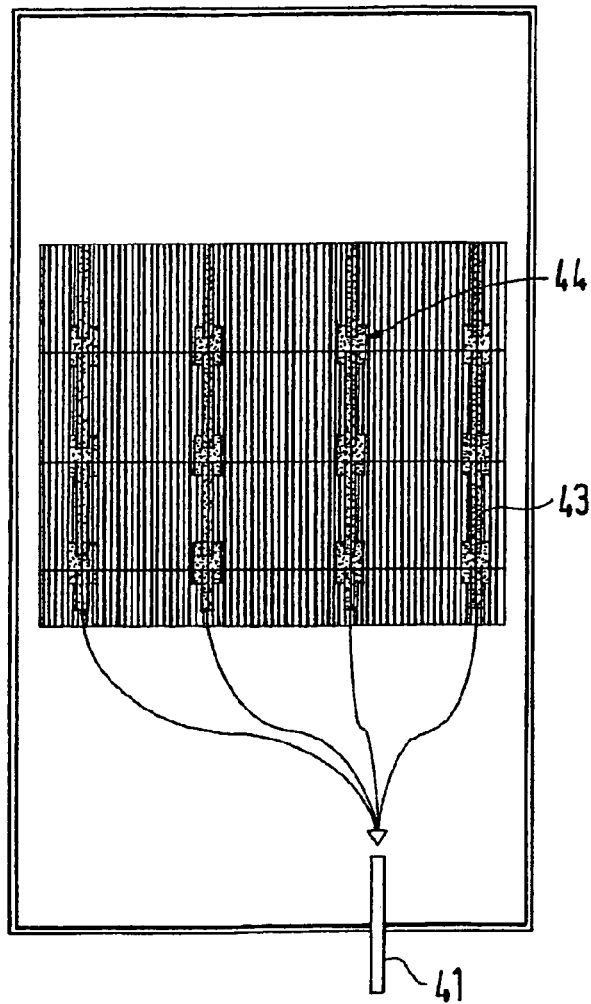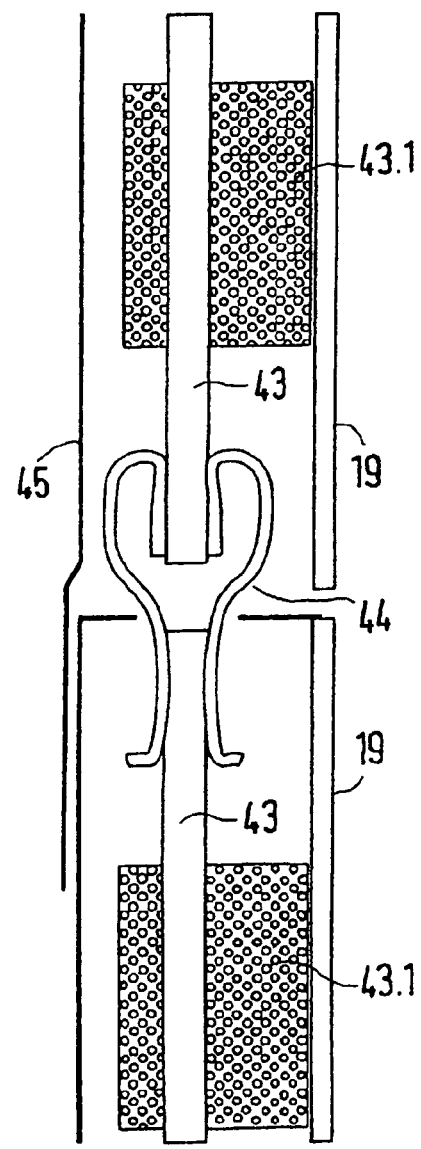
FIG. 3A
FIG. 3B

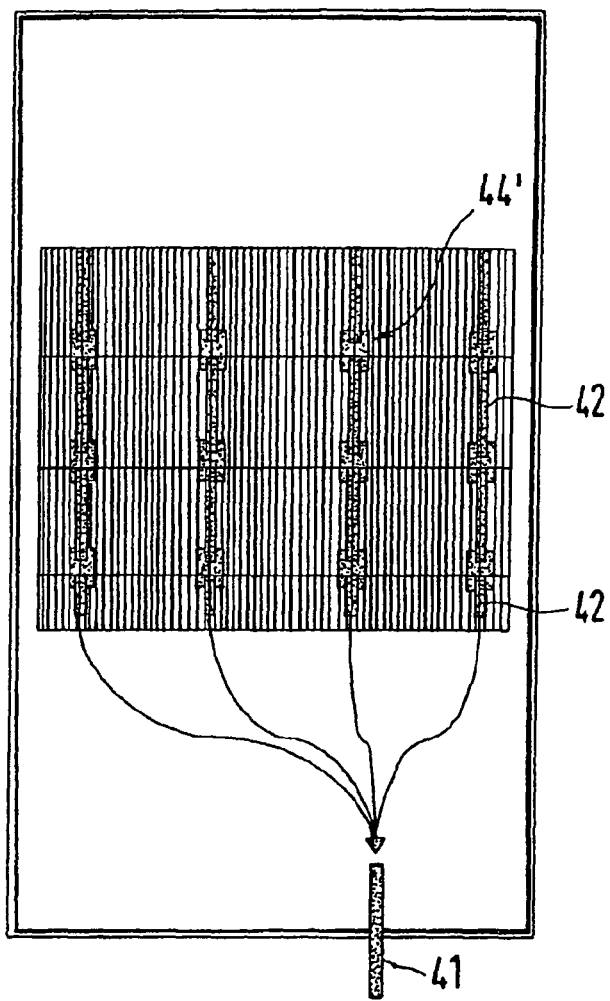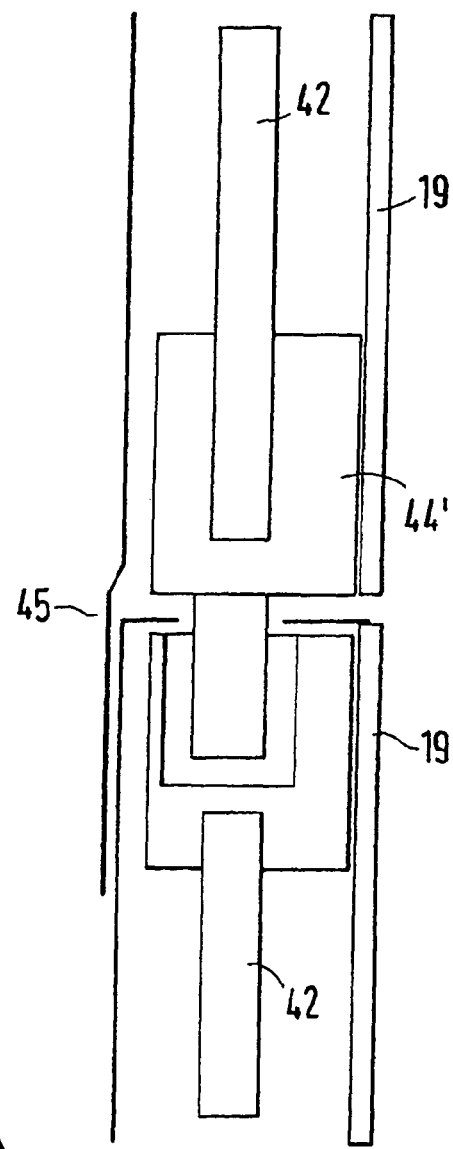
FIG. 4A
FIG. 4B

SWITCHGEAR CABINET ASSEMBLY OR RACK ASSEMBLY

BACKGROUND OF THE INVENTION

1. Field of the Invention

This invention relates to a switchgear cabinet assembly or rack assembly having an electric current supply arrangement, which is connected or can be connected to a main current supply arrangement, to which devices are connected or can be connected, which are to be supplied and are housed in a switchgear cabinet or a rack of the consumer.

2. Discussion of Related Art

A switchgear cabinet assembly or rack assembly with an electric current supply arrangement is taught by German Patent Reference DE 199 11 196 A1, wherein various devices arranged in a switchgear cabinet can be supplied with current by an electric current supply arrangement. The electric current supply arrangement also has a connection to a main current supply arrangement. If, for example, various consumers in a computing center are present not only in one switchgear cabinet or rack but, if required, also in additional switchgear cabinets or racks, expensive electrical installation steps are required, wherein at least a greater portion of the connections must be made by skilled personnel.

A rack in the form of a tower stand for server PCs is taught by German Patent Reference DE 298 13 657 U1. An electric current supply arrangement with a horizontal row of side-by-side located current supply modules and a sub-net distributor supplying them, which is supplied with current via a supply cable, is arranged in the lower area of the stand. The current supply modules are inserted into plug-in shafts of the stand in a manner in which they can be pulled out and pushed in, and are electrically connected to the sub-net distributor in the connecting area via a respective electrical cable, which is conducted through a lower elongated hollow chamber. No statements regarding a connection of the current supply modules with each other are made, and no detailed information is provided regarding the connection of the devices.

Various contacting arrangements for contacting of contact rails and switching devices in a switchgear cabinet are shown in German Patent Reference DE 297 16 201 U1.

An energy supply arrangement with inserting devices and contact apparatuses is disclosed in German Patent Reference DE 25 15 152, wherein the inserting devices can be locked and can also be electrically connected and disconnected by operating a switch. In German Patent Reference DE 198 26 453 C2, feed-through adapters or sockets installed in a wall unit for supplying electricity are shown in German Patent Reference DE 198 26 453 C2.

SUMMARY OF THE INVENTION

One object of this invention is to provide a switchgear cabinet assembly or rack assembly of the type mentioned above but which, following the provision of a main connection, electrical consumers, in particular devices to be supplied, can be simply and variably connected even by a layman.

This object is attained with a switchgear cabinet assembly having characteristics taught in this specification and in the claims. According to this invention, a sub-distribution arrangement having at least one sub-distribution unit which can be connected or is connected to the main current supply has its own housing or its own frame, is arranged in at least one switchgear cabinet or rack of the consumer, or in a separate switchgear cabinet or rack, and is maintained or secured therein by a mounting unit. On one side the sub-distribution unit is connected or can be connected with main supply lines leading to the main current supply, and on the other side is connected or can be connected to connecting lines leading to the devices to be supplied.

The consumer only needs to connect the sub-distribution unit to the assigned connector of the main supply line provided with a plug-in connection and, on the other side of the sub-distribution unit, then also connect the connection lines leading to the devices, or to the cabinets or racks of the user, also having appropriate plug-in connectors. In this case, the sub-distribution unit in the respective cabinet or rack offers various and variable connecting options, so that electrical connecting work, for example following a rearrangement of the layout, can be easily performed.

Here, the connection between the main current supply and the sub-distribution units is simplified if the main supply lines have a network connecting cable and at least one supply cable, or several supply bus bars, to which the at least one sub-distribution unit is connected. In this case, the supply cable can be a part of the network connecting cable.

Also, a construction advantageous for assembly includes the sub-distribution units having contact terminals for connection to the supply bus bars, or plug-connector units for connection to the at least one supply cable.

If several sub-distribution units are connected with each other by pre-fabricated connecting cables or similar bridges, in which case they have appropriate plug connectors, only one of the sub-distribution units needs to be connected to the main current supply.

Protection for the consumer is assured because the supply bus bars or supply cables are covered, protected against touching, by a protective covering.

If the sub-distribution units are provided with fuses inserted into fuse plug-in locations, and with these respectively protected plug-in connectors are designed for the connection with the connecting lines on the part of the user, construction is further simplified, in which case corresponding safety fuses can be omitted in the cabinets, or racks, by the user.

Assembly work is further simplified if one or several profiled strips with electric current conductors, which extend on them and are protected against touching, each is arranged in at least one switchgear cabinet, or rack, of the consumer, which are accessible for connection with the devices to be supplied via adapter units which can be variously connected. Thus, not only the securing of the connecting lines in the individual cabinets or racks of the consumer is simple, because one connection per profiled strip is sufficient, but the consumer can make the connection of the device inside the cabinet at a suitable location without hindrance.

To assure the current supply of the consumers, even when the network current supply fails, an interruption-proof current supply arrangement can be provided as a main current supply arrangement in the cabinet or rack having the sub-distribution device, to which arrangement the sub-distribution device is connected or to which it can be automatically switched if a failure of the network supply is detected by a monitoring arrangement.

Connecting work is simplified if several sub-distribution units are connected or can be connected with each other by coupling/plug units directly or by pre-fabricated cables, and only one of the sub-distribution units is connected with the main current supply. Thus, cascading of the sub-distribution units is easily possible.

A simple, well-arranged cable routing is achieved if the cabinets of the consumer and/or the sub-distribution cabinet, or possibly the racks are provided in the base area or in the roof area at the rear or the front with a cable conduit for the connecting lines, and a removable cover for introducing connecting lines is provided on the respective switchgear cabinet or rack.

The following steps contribute to the safety of the electric current supply arrangement with the possibility of avoiding overloads and of displaying information to the consumer, wherein there is a pick-up unit for measuring and monitoring the current or the voltage supplied through the connecting lines. It is thus possible to show the consumer still unused capacities or required expansions of the supply system.

Those steps contribute to additional safety and assurance of functionality, wherein there is a safety device designed so that inserting or pulling out of the sub-distribution unit under electrical load is prevented.

A simple connecting possibility of the connecting line leading to the device of the user to be supplied is obtained if a receiving socket for receiving a plug-in element of the consumer connecting line is arranged in a lateral housing wall of the at least one sub-distribution unit, and if a lead-through opening for the plug-in element is cut into a wall adjoining the cabinet. With these steps, the respective sub-distribution unit is not accidentally disconnected from the main current supply, and the current supply of connected devices is thus interrupted.

An advantageous safety device includes the safety device having a switch arrangement for disconnecting the load, which works together with a locking arrangement of the sub-distribution unit.

BRIEF DESCRIPTION OF THE DRAWINGS

This invention is explained in greater detail in view of the drawings, wherein:

FIGS. 3A and 3B show an embodiment for the connection of sub-distribution units to a main current supply, and of sub-distribution units with each other;

FIGS. 4A and 4B show a further embodiment of the connection of sub-distribution units to a main current supply, and to each other;

DETAILED DESCRIPTION OF THE INVENTION

Figure 1:
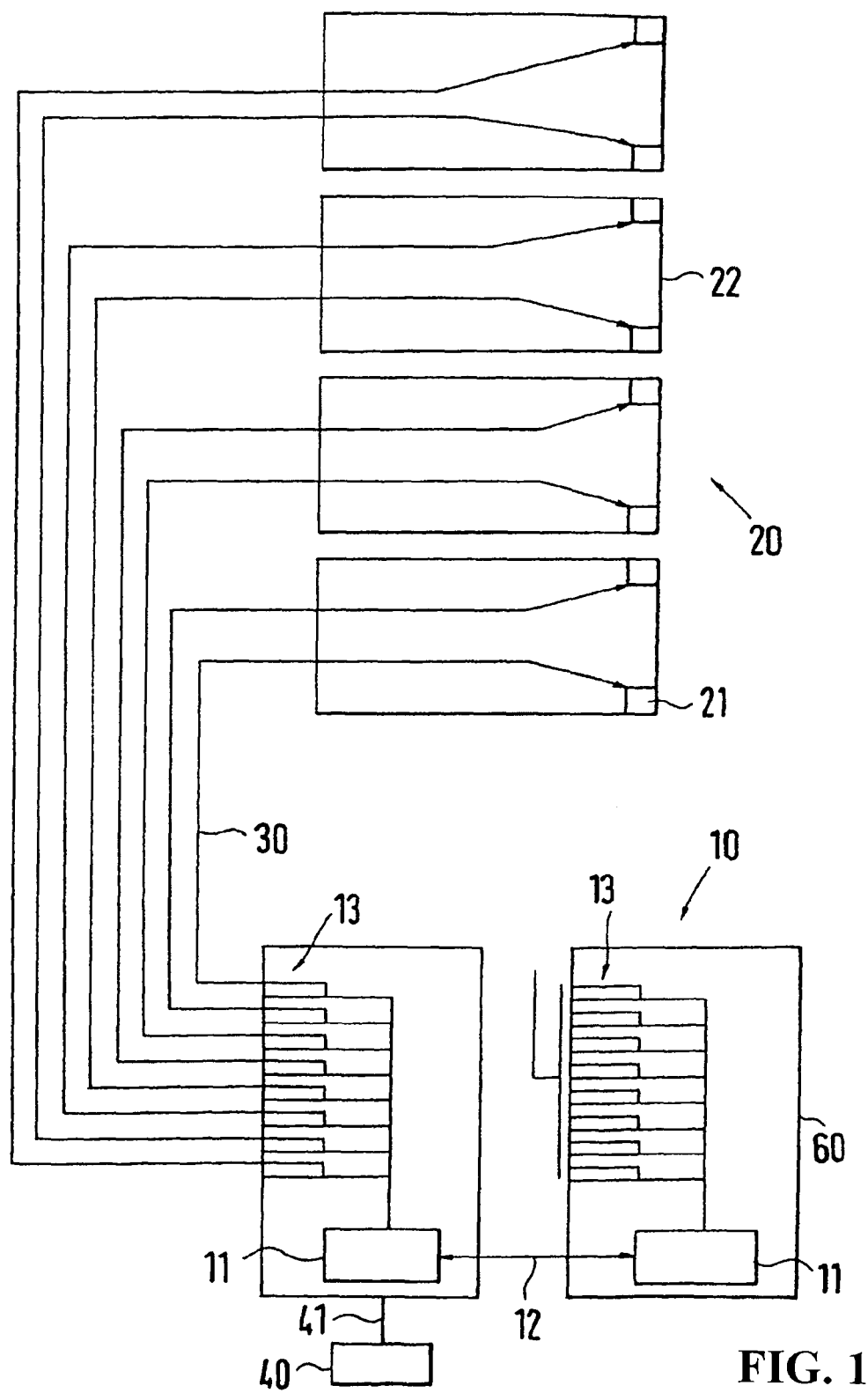
FIG. 1 shows a switchgear cabinet assembly with an electric current supply arrangement in a schematic view.

A switchgear cabinet assembly with an electrical power supply arrangement shown in FIG. 1 has two sub-distribution cabinets 60, in which a sub-distribution arrangement 10 with sub-distribution units 11 is arranged, and has user cabinets 20, connected to the sub-distribution arrangement 10 via connecting lines 30, with take-off bus bars 21, for example in the form of profiled strips, to which the devices housed in the respective user cabinets 22 and to be supplied can be connected. The sub-distribution arrangement 10 is connected to a network electrical supply 40 via a network connection cable 41. The sub-distribution units 11, which are arranged in the two sub-distribution cabinets 60 vertically above each other and horizontally oriented, are connected with each other via a connecting line 12. The sub-distribution units 11 are mechanically maintained and secured by respective mounting units in the respective sub-distribution cabinet 60. For this purpose, the mounting unit has mounting elements, which can be connected directly or by mounting rails and further mounting elements with a rack of the cabinet, on which the sub-distribution elements 11 can be fixed in place with counter-elements provided on them. The mounting elements advantageously comprise respective horizontal rail elements, on which the assigned sub-distribution units 11 can be slid in a position. Screws and/or snap-in connector elements or manually operable other locking elements are provided for securing. The sub-distribution units are advantageously embodied as push-in units. At least one sub-distribution unit 11 can accordingly be housed and mounted in a further cabinet 20.

Figure 2B:
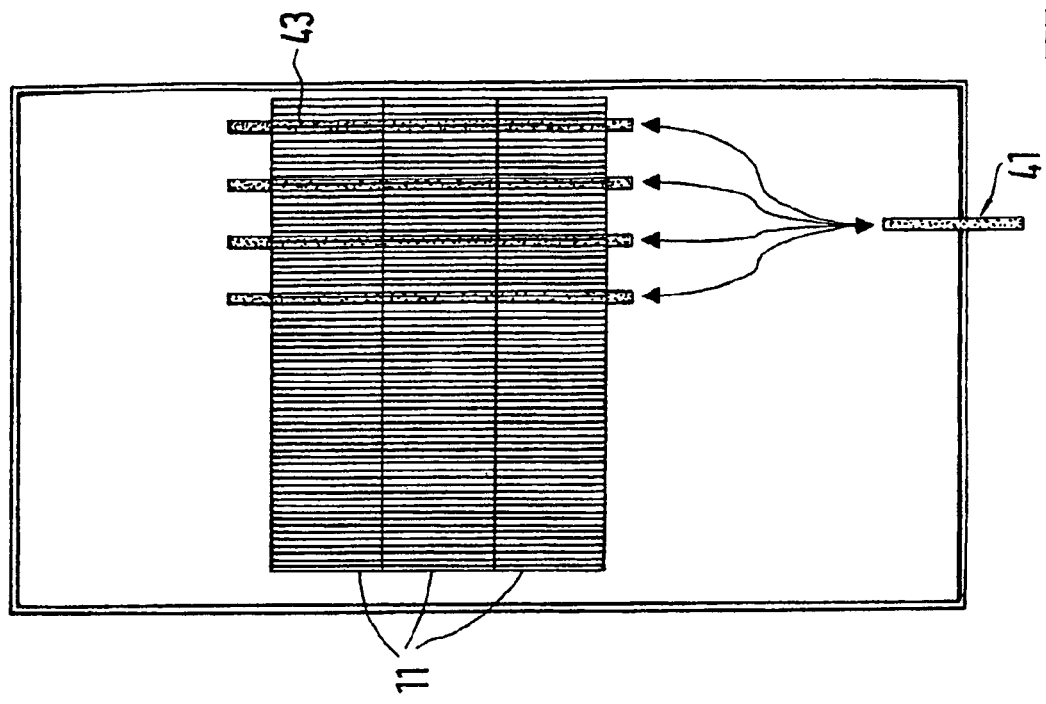
FIGS. 2A and 2B show two alternative embodiments for connection of sub-distribution units to a main current supply.
Figure 2A:
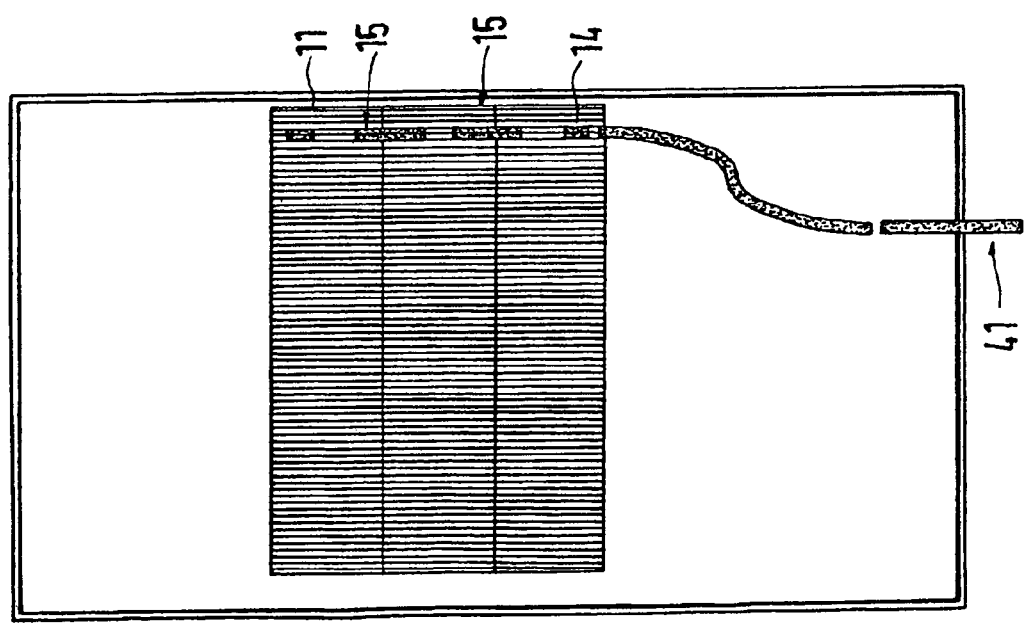

As shown in FIGS. 2A and 2B, several sub-distribution units 11 are connected either via a cable, or directly, with the network connection cable 41, as shown in FIG. 2A, wherein only one sub-distribution unit 11 is connected to the network connection cable 41, while the further sub-distribution units 11 are connected to the sub-connection distribution unit connected to the network connection cable 41 by pre-fabricated connecting cables 15 and plug connectors arranged on the sub-distribution units 11, or the network connection cable 41 is connected to supply bus bars 43, to which the sub-distribution units 11 are connected.

In the case of a connection of the respective sub-distribution units 11 with a supply cable 42, the connection can be provided by a simple plug-in connection, while the bus bars permit higher current strengths of, for example, more than 100 Ampéres. The bus bars in particular must be covered, protected against touching, by a protective covering 45, such as shown in see FIG. 3B. The bus bars, for example a quadripole bus bar system, is perpendicularly mounted, for example. Bores are located on the front of the protective covering 45, which is for example made of a plastic material, through which the sub-distribution units 11 are connected with the bus bars 43 by contact terminals. The sub-distribution units 11, which are preferably maintained in a 19-inch housing or frame, are fixed in place following insertion by the contact terminals.

In the exemplary embodiment shown in FIGS. 3A and 3B, bus bar sections are attached, protected against touching, on the rear of the sub-distribution units 11. A contact terminal is located at the lower end of each of a bus bar 43, which brought into contact with bus bars of an already mounted sub-distribution unit 11 by being plugged together with it. When plugged together, protection against touching is assured by a protective covering 45, or the casing of the bus bars 43. Feeding into the bus bars 43 occurs by a special module, which is preferably mounted on the lowermost location. The bus bar sections of the lowermost sub-distribution unit 11 are connected via the contact terminals 44 with the bus bar sections of the feed module.

In the embodiment of FIGS. 4A and 4B, in case of a connection by a supply cable 42 the sub-distribution units 11 are directly connected with each other by being plugged together via plug-in connector units 44' including plugs and sockets. The plug of the network connection cable 41 fits into the plug-in connector of the lowermost sub-distribution unit. No bridging cables between the sub-distribution units 11 are required with this embodiment.

Figure 5:
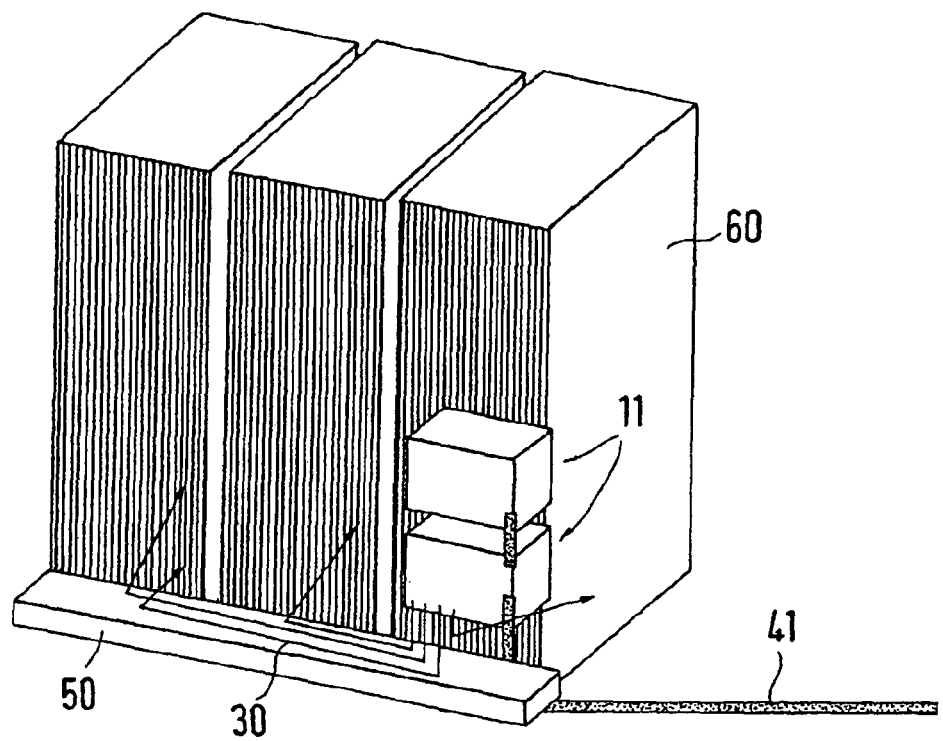
FIG. 5 shows a switchgear cabinet assembly with an electric current supply arrangement in a perspective view.
Figure 8:
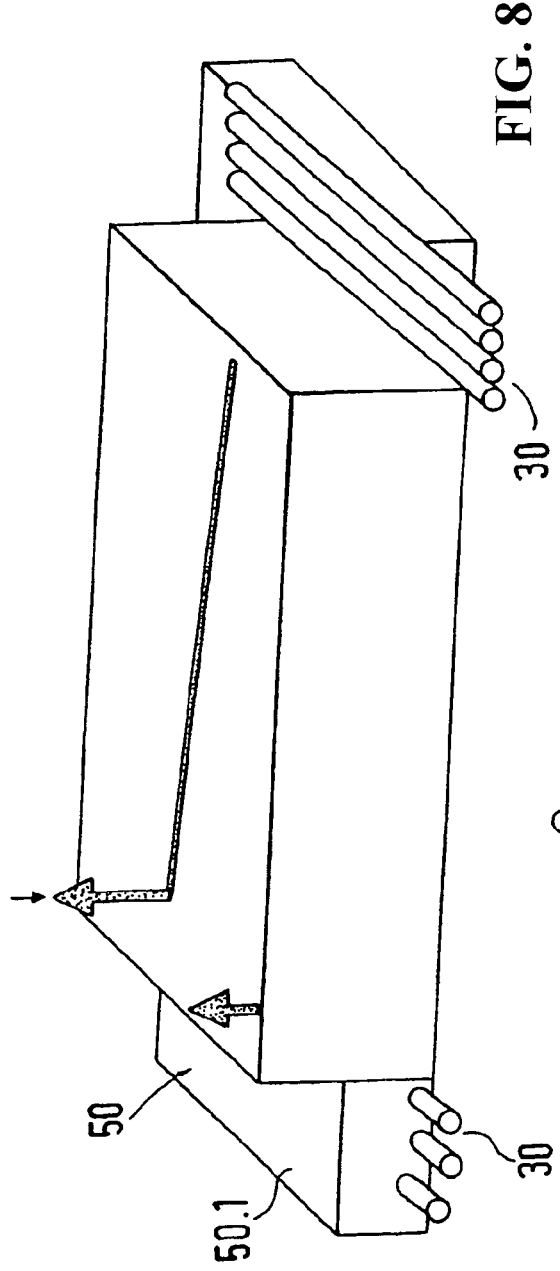
FIG. 8 shows a base area of a switchgear cabinet with cable conduits.
Figure 9:
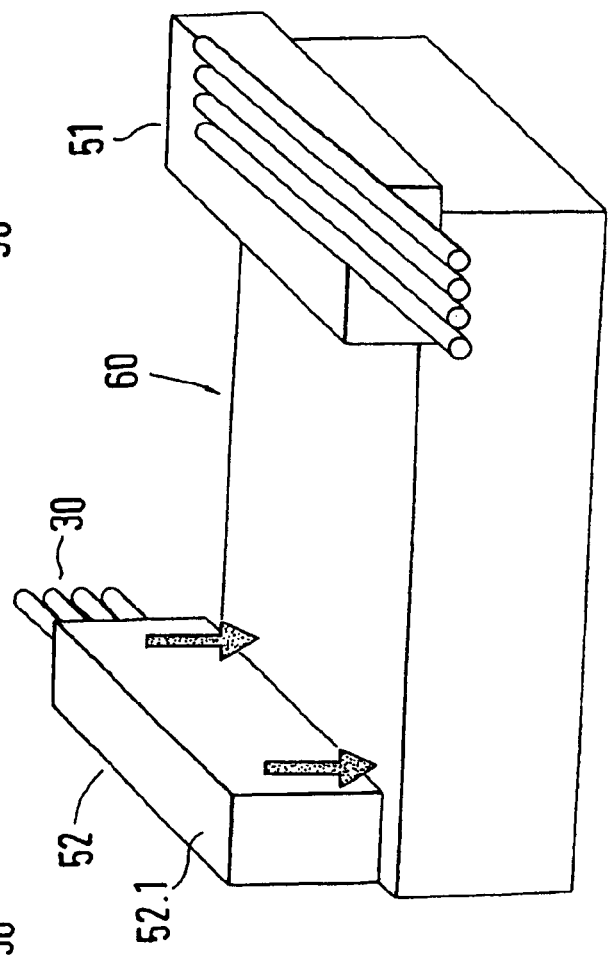
FIG. 9 shows a roof area of a switchgear cabinet with cable conduits.
Figure 10:
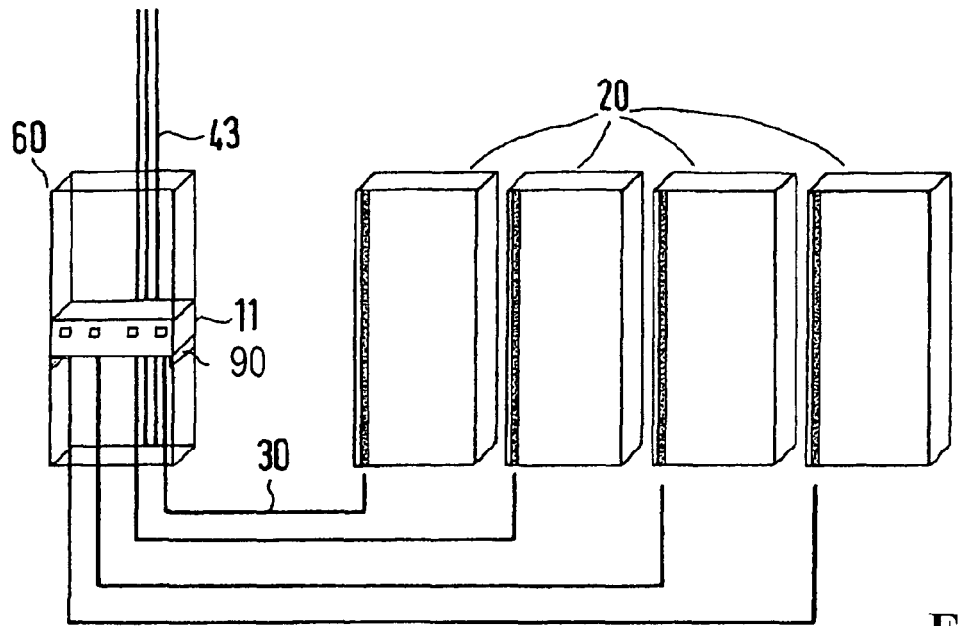
FIG. 10 shows a further schematic view of a switchgear assembly with a sub-distribution unit.

As schematically shown in FIG. 5, the connecting lines 30 from the sub-distribution units 11, also arranged in the cabinet 60, to the profiled strips 21 on the user side are conducted through cable conduits 50, which are arranged on the front or back of the cabinets 22 of the user cabinets 22 and form a continuous cable conduit arrangement. As FIG. 8 shows, the cable conduit 50 can be covered by a cable conduit covering 50.1. The conduit can be fastened, for example releasably, in front of or behind the base of the respective cabinet 22, or correspondingly also of the cabinet 60. As FIG. 9 shows, it is alternatively, or also additionally, possible to arrange a cable conduit 51, 52, if required also with a cable conduit covering 52.1, in the roof area of the respective cabinet 22, 60, which can also be designed to be removable. The covering can be a lid extending over the entire length and can be opened by a tool. The connecting lines, or cables 30 are fixed in place at several locations in the cable conduit 50, or 51, 52.

In case of the arrangement of the cable conduit 50 at the base, a cover is removed and, if desired, replaced with a cover with a cutout. The cable conduit 50 has a matching cutout on the back, which is congruent with the cutout in the cover.

Figure 6:
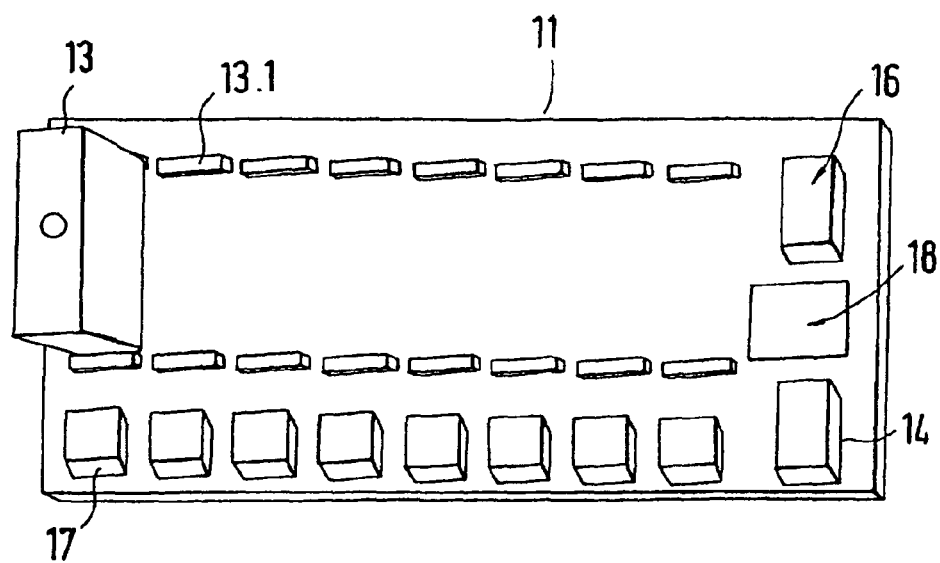
FIG. 6 shows a sub-distribution unit with various components, in a schematic representation.
Figure 7:
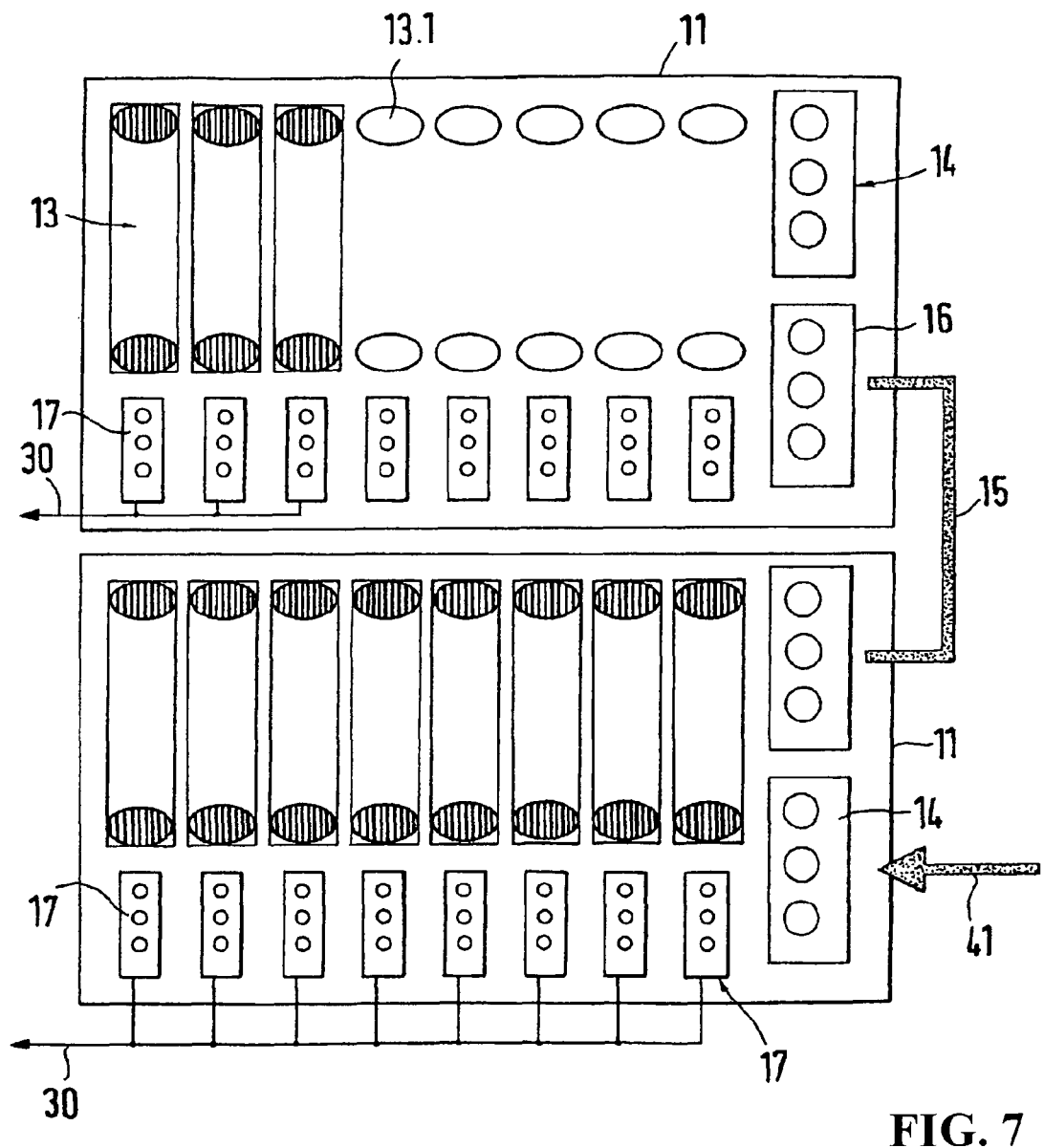
FIG. 7 shows two sub-distribution elements, which are electrically connected with each other, with various components in a schematic view.
Figure 15:
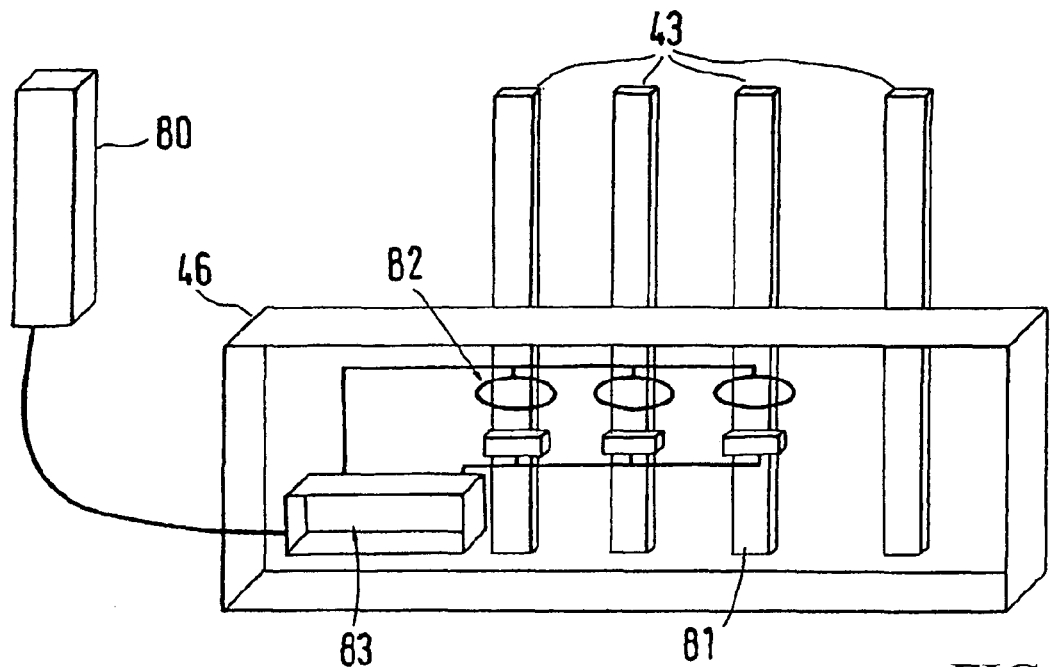
FIG. 15 shows a monitoring arrangement for the electrical power supply arrangement in the area of a feed unit connected to the main power supply.

As shown in FIGS. 6 and 7, the sub-distribution units 11 have fuses 13 inserted into fuse plug-in locations 13.1, so that preventive steps regarding excessive electrical currents are taken at respective plug-in connectors 17 for the connecting lines 30, so that correspondingly further fuses in the user cabinets 22 can be omitted. The sub-distribution unit 11 furthermore has plug receptacles or sockets 14, 16 for connections between each other or with the network connection cable 41. FIG. 15 shows a bridge between two sub-distribution units 11 which can be designed, for example, in the form of a short cable with two plug connectors, as described above.

An electronic monitoring device 18 can be arranged in the sub-distribution unit 11. As shown in FIGS. 3B, 4B, the sub-distribution units can be arranged on appropriate mounting plates 19, to which supply bus bar sections 43 are attached by appropriate supply bus bar holders 43.1.

Figure 11:
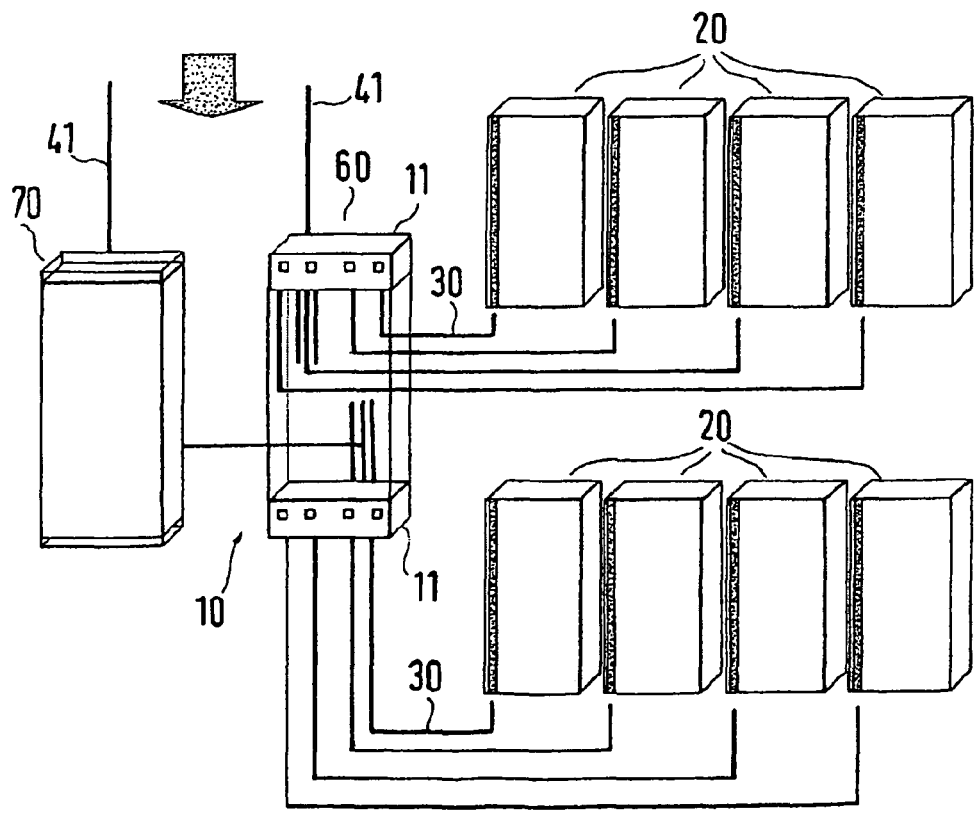
FIG. 11 shows a further embodiment of a switchgear cabinet assembly with several sub-distribution units connected to different main current supply arrangements.

Supplementing the network electrical supply 40, an interruption-proof current supply (USV) is advantageously provided, to which the sub-distribution units 11 connected to the network electrical supply 40 are switched if a network voltage failure is detected by an appropriate detector unit, or to which a different sub-distribution unit 11 is connected from the start, as shown in FIG. 11. In the interruption-proof current supply 70 which, for example, is modularly constructed and thus can also constitute the main supply, the electronic device is placed, for example separate from the supply batteries, in a housing which, for example, is also put in place in the form of a 19-inch installation corresponding to the sub-distribution unit 11, while the supply batteries can be installed in one or several units in the take-off bus bars, or profiled strips 21. Water cooling is advantageously selected for cooling, wherein water flows through cooling elements on the various components. The cooling units are connected with hoses and plug-in connectors for supplying cooled and removing heated water, wherein cooling is monitored and regulated. The interruption-proof current supply is connected by plug-connectors with the batteries, which can be easily exchanged.

Adapter units, which can be variably inserted at different locations into the profiled strips 21, are provided for a simple connection of the devices. Current is conducted in the profiled strips 21 by bus bars, which are embedded, protected against touching, or by insulated cables.

Figure 14:
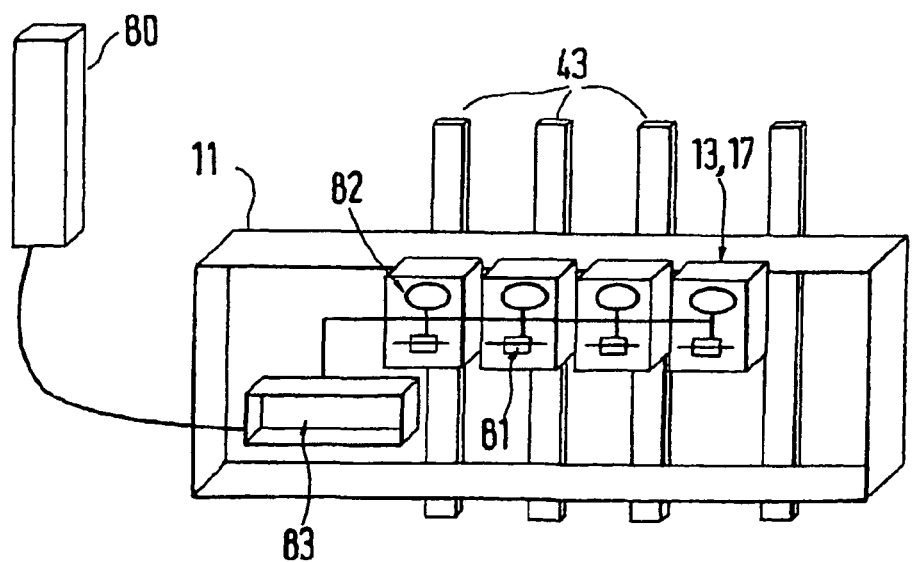
FIG. 14 shows a monitoring arrangement for the electrical power supply arrangement in a sub-distribution unit.
Figure 16:
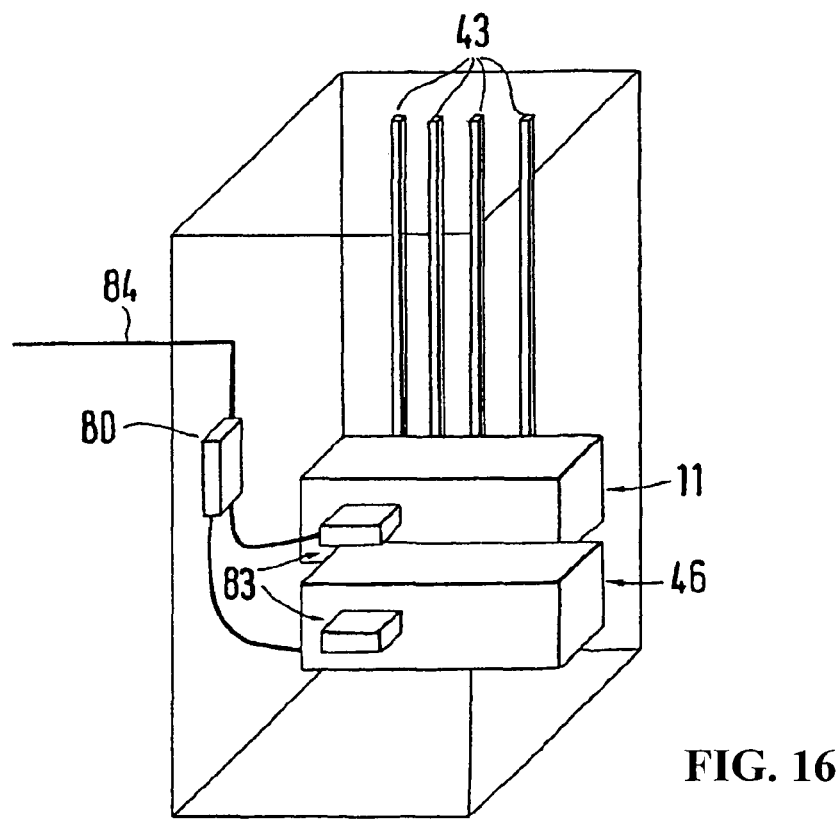
FIG. 16 shows a schematic view of a monitoring arrangement in the area of the electrical power supply arrangement.

The current supplied via the connecting lines 30 can be measured and monitored at suitable locations, for example at the feed-in location from the main supply point, for example at a feed-in module 46, or at the sub-distribution units, or at the location of feeding into the profiled strips 21, or within the profiled strips 21, as shown as an example in FIGS. 14 to 16. The measurement signals can be used to trigger, for example, an overload signal in place, and to inform the consumer. The measurement signal is supplied to a higher-order switchgear cabinet monitoring system 80, which can evaluate the measurement signals more accurately and can develop suitable data for generating information and/or trigger signals for actuators. Measuring of the current or the voltage takes place via a current or voltage transformer, measuring transformers and advantageously by means of A/D conversion and forwarding of the measuring signals via a serial interface. The fuses or safety switches can be monitored in a similar manner. The information is also passed on via the serial interface. In this case, monitoring can be performed by auxiliary contacts at the safety switches, or also by measuring the voltage upstream and downstream of the fuse.

The described measures result not only in an easily manageable, variable electrical current supply arrangement, but also assure the safety required for the consumer.

FIGS. 10 to 13 show various further embodiments for switchgear cabinet arrangements with sub-distribution units 11. In accordance with FIG. 10, a sub-distribution unit 11 seated in a separate sub-distribution cabinet 60 is supplied via bus bars with current from the main current supply and is connected via connecting lines 30 to a group containing four user cabinets. In the embodiment in accordance with FIG. 11, two sub-distribution units 11 are connected in a separate sub-distribution cabinet 60, to which units two groups of respectively four user cabinets 20 are connected via respective connecting lines 30. The one sub-distribution unit 11 is supplied, for example via an assigned group of supply bus bars, directly from a network supply as the main supply, while the other sub-distribution unit is supplied via different assigned supply bus bars 43 by an interruption-proof current supply 70 as the main supply, which is connected with the network supply via a network connection cable 41. In this example, the interruption-proof current supply 70 is housed in its own cabinet. It is also possible to house the interruption-proof current supply in the same cabinet as the sub-distribution units 11.

Figure 12:
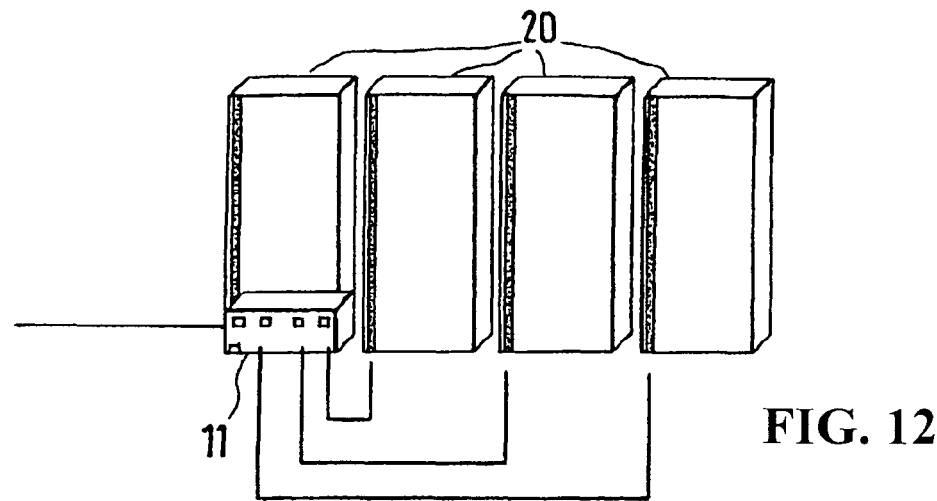
FIG. 12 shows a further embodiment of a switchgear cabinet assembly with a sub-distribution unit.
Figure 13:
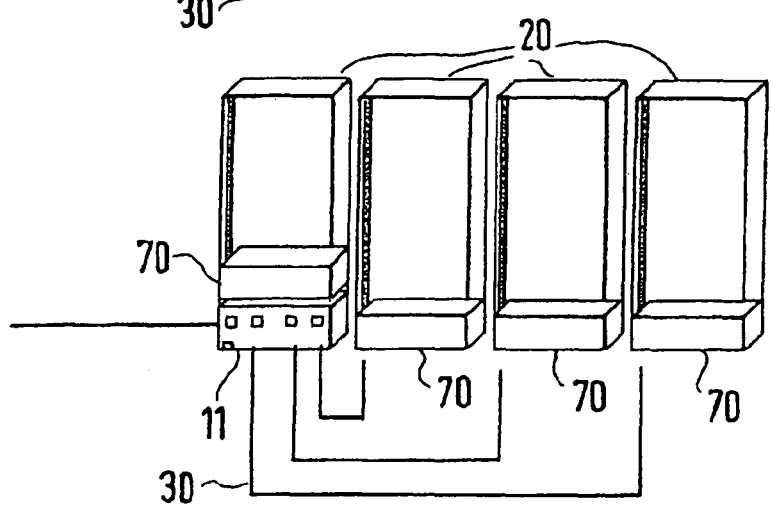
FIG. 13 shows an embodiment of a switchgear cabinet assembly with a sub-distribution unit and an interruption-proof current supply arranged in the respective cabinets.

In the embodiment shown in FIG. 12, a sub-distribution unit 11 is housed in a user cabinet 20 and supplies the further user cabinets, as well as the consumers in the user cabinet 20 in which itself is housed, via respective connecting lines 30. In comparison with the arrangement in FIG. 12, in accordance with FIG. 13 interruption-proof current supply devices 70 are additionally housed in the individual cabinets, to which the consumers located in the cabinets are connected in order to assure the supply in case of the failure of the network supply.

In the embodiments in accordance with FIGS. 10 to 13, the sub-distributors 11 are per se constructed corresponding to the exemplary embodiments explained by FIGS. 1 to 9 and are connected in a corresponding manner with the main current supplies, as well as the consumers.

FIG. 14 represents a monitoring arrangement for the electrical power supply arrangement in a sub-distribution unit 11, which is connected via three phases and a zero conductor to a main supply. Accordingly, respective voltage transformers 81 and/or current transformers 82 are provided for each phase and, if desired also for the zero conductor, by which corresponding measuring signals are picked up and fed to a sensor unit 83, in which the current and voltage signals are converted into suitable data and are supplied to the higher order switchgear cabinet monitoring system 80 via a bus connection, for example via a serial interface. The respective phases can be differentiated by the sensor unit 83, so that a definite evaluation and, if required, an assigned overload signal can be issued via the switchgear cabinet monitoring system 80, or a shut-off can be performed via assigned actuators.

As FIG. 15 shows, such a monitoring arrangement with current transformers 82 and/or voltage transformers 81, as well as a sensor unit 83 connected thereto, can also be provided in a feed-in module for feeding the supply bus bars 43 leading to each sub-distribution unit 11, or the supply cable 42. Here, too, the signals picked up by the sensor unit 83 are passed on by the sensor unit 83 to the switchgear cabinet monitoring system 80 for further evaluation.

FIG. 16 shows an embodiment in which a monitoring arrangement in accordance with the exemplary embodiments of FIGS. 14 and 15 is assigned to a sub-distribution unit 11, as well as to a feed-in module 46. Here, the switchgear cabinet monitoring system 80 receives data from both connected sensor units 83 for evaluation and further processing. The data from the switchgear cabinet monitoring system 80 can also be updated in the switchgear cabinet monitoring system 80 for further transmission to remote locations via a network system 84, so that remote monitoring and remote control are possible.

Figure 17:
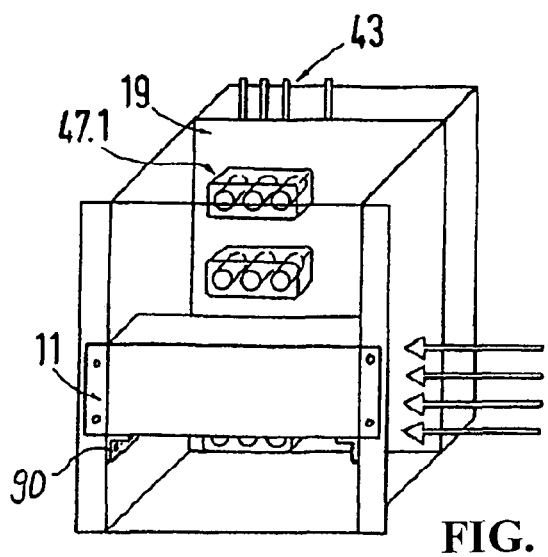
FIG. 17 shows a partial view of a switchgear cabinet or a switchgear rack with an installed sub-distribution unit, in a perspective plan view.
Figure 18:
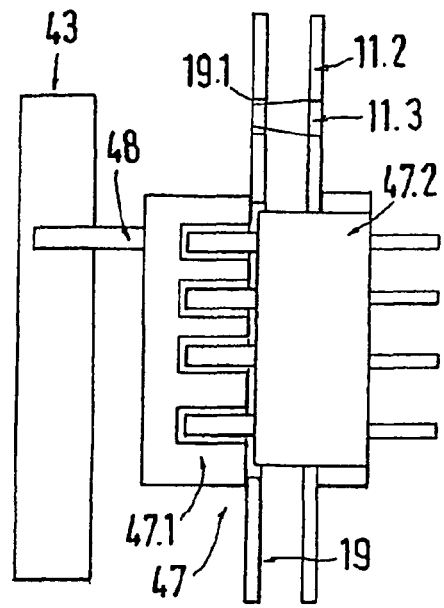
FIG. 18 shows a connection area of a sub-supply unit at a supply bus bar in a lateral plan view.
Figure 19:
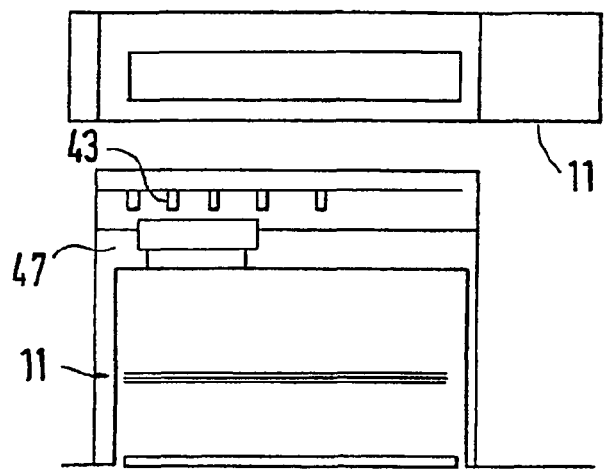
FIG. 19 shows a schematic view of a sub-distribution unit from a front and in an installed state from above.

FIG. 17 shows a sub-distribution unit 11 introduced into the interior of a switchgear cabinet or rack and designed, for example, as a 19" push-in unit, which is held by a mounting unit 90 having lateral rail elements or mounting strips extending horizontally into the interior of the cabinet or rack. Sockets 47.1 for plugs 47.2 arranged at the rear of the push-in unit 11 in the cabinet interior on vertically extending supply rails 43. The supply rails 43 are covered by one or several mounting plates 19, through which only the sockets 47.1 are accessible for the plugs 47.2. With this plug/socket unit 47, the sub-distribution unit 11 can be connected in a simple manner and free of contact by pushing it into the interior of the cabinet or the rack, which can also be seen in FIG. 18, in which a connecting means 48 is also represented between the socket 47.1 and a supply rail (bus bar) 43. The plug 47.2 is arranged in a rear wall 11.2 of the housing of the sub-distribution unit 11, while the socket 47.1 is arranged in or behind a recess in the mounting plate 19. For positive centering of the sub-distribution unit 11 designed as a push-in unit, at least one centering mandrel 11.3 is arranged on the rear wall 11.2, which engages a centering opening 19.1 matched to it in the mounting plate 19. For a positionally accurate, simply guided insertion of the respective sub-distribution unit 11, the horizontal rail elements of the mounting unit are matched to the height of the plug and the socket, or of the mandrel, taking into consideration a respective vertical offset. Lateral boundaries assure an exact positioning transversely to the push-in direction. FIG. 19 shows the sub-distribution unit 11 introduced into the interior of the cabinet or rack, as well as a plug/socket unit 47, from above as well as from the front. A top-hat rail arrangement can, for example, be in the interior of the housing for mounting the fuses or similar protective elements.

Figure 20:
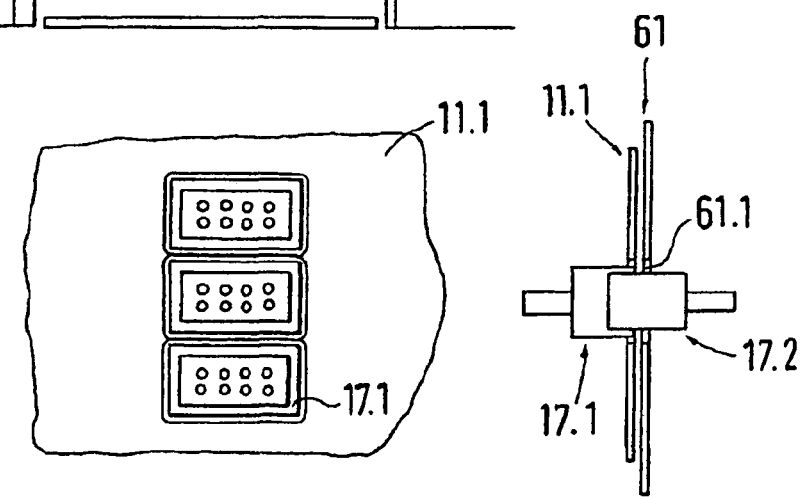
FIG. 20 shows a lateral area of a sub-supply unit with a connecting section.

In a further embodiment of the sub-distribution unit 11 in connection with an installation space in the cabinet or rack which is shown in FIG. 20, an arrangement of receiving sockets 17.1, into which plug elements 17.2 of the consumer connecting lines 30 can be plugged, is provided in a lateral wall 11.1 of the sub-distribution unit 11 designed as a push-in unit. Adjoining the receiving sockets 17.1, an introduction opening 61.1 is arranged in a cabinet wall 61 which, in the inserted state of the push-in unit, is congruent with the position of the respective receiving socket 17.1. When the plug element 17.2 is pushed into the receiving socket 17.1, the push-in unit cannot be accidentally pulled out. With this arrangement, a dependable connection, along with a definite seating, of the sub-distribution unit 11 is assured, and insertion or pull-out of the push-in unit 11 while under load is performed can be prevented.

It is also possible for avoiding the insertion or pull-out of the push-in unit under load to provide a switch arrangement in the sub-distribution unit 11. Here, the embodiment has, for example, a turnbuckle lever located on a shaft, which projects through a cutout of the lateral wall 11.1 of the push-in unit 11 and the oppositely located lateral wall of the push-in unit 11 and locks the sub-distribution unit 11 to the adjoining lateral wall of the cabinet or rack or to another element fixed in place on the switchgear cabinet or the rack. Locking becomes active when the switch arrangement is switched on, it is unlocked upon switch-off. With this, too, the sub-distribution unit 11 can be removed or inserted in the load-free state.

The invention claimed is:

1. An electric current supply arrangement to which devices supplied and housed in at least one switchgear cabinet (22) or rack are connectible, the electric current supply arrangement comprising:

a sub-distribution arrangement (10) having a sub-distribution unit (11) connectible to a main current supply and having a housing or a frame, arranged in one of the at least one switchgear cabinet (22) or rack or a separate cabinet (60) or rack, and is maintained or secured therein by a mounting unit (90), wherein on one side the sub-distribution unit (11) is connectible with at least one main supply line (41, 42, 43) leading to the main current supply (40) to receive electric current, and on an other side is connectible to connecting lines (30) leading to the devices to be supplied with the electric current;

the sub-distribution unit (11) including a plurality of plug-in connectors (17) connectible to the connecting lines and the sub-distribution unit (11) including a fuse plug-in location (13.1) for each of the plurality of plug-in connectors (17);

the sub-distribution unit (11) including connecting cables or plug connectors for connecting further sub-distribution units (11) to the main supply through connection to the sub-distribution unit (11).

2. The electric current supply arrangement in accordance with claim 1, wherein the at least one main supply line has a network connecting cable (41) and at least one supply cable (42) or supply bus bars (43) to which the at least one sub-distribution unit (11) is connected.

3. The electric current supply arrangement in accordance with claim 2, wherein the sub-distribution unit (11) has a contact terminal (44) for connection to the supply bus bars (43) or a plug-in connector unit (44') for connection to the at least one supply cable (42).

4. The electric current supply arrangement in accordance with claim 3, further comprising several sub-distribution units (11) connected by pre-fabricated connecting cables (15) or connected with each other via connecting sections of the supply bus bars (43) via contact terminals (44).

5. The electric current supply arrangement in accordance with claim 4, wherein the supply bus bars (43) or the at least one supply cable (42) are covered, protected against touching, by a protective covering (45).

6. The electric current supply arrangement in accordance with claim 5, wherein the sub-distribution units (11) have fuses (13) inserted into fuse plug-in locations (13.1) to provide protected plug-in connectors (17) for connection with the connecting lines (30).

7. The electric current supply arrangement in accordance with claim 6, wherein at least one profiled strip (21) with an extending electric current conductor, protected against touching, is arranged in the at least one switchgear cabinet (22) or rack, which is accessible for connection with at least one of the devices to be supplied.

8. The electric current supply arrangement in accordance with claim 7, wherein the sub-distribution units (11) are connectible with each other directly or by the pre-fabricated cables (15), and only one of the sub-distribution units is connected with the main current supply (40).

9. The electric current supply arrangement in accordance with claim 8, wherein at least one of the switchgear cabinet (22) or rack, or the separate cabinet (60) or rack, is provided in the base area or in the roof area at a rear or a front with a cable conduit (50, 51, 52) for the connecting lines (30), and includes a removable cover (52.1) for introducing the connecting lines (30).

10. The electric current supply arrangement in accordance with claim 9, wherein the sub-distribution units (11) include a safety device that prevents inserting or pulling out of the sub-distribution units (11) under an electrical load.

11. The electric current supply arrangement in accordance with claim 10, wherein a receiving socket (17.1) for receiving a plug-in element (17.2) of the consumer connecting line (30) is arranged in a lateral housing wall (11.1) of the sub-distribution units (11), and a lead-through opening (61.1) for the plug-in element (17.2) is cut into a wall adjoining the cabinet.

12. The electric current supply arrangement in accordance with claim 1, further comprising several sub-distribution units (11) connected by pre-fabricated connecting cables (15) or connected with each other via connecting bus bar sections (43) via contact terminals (44).

13. The electric current supply arrangement in accordance with claim 2, wherein the supply bus bars (43) or the at least one supply cable (42) are covered, protected against touching, by a protective covering (45).

14. The electric current supply arrangement in accordance with claim 1, wherein the sub-distribution unit (11) has fuses (13) inserted into fuse plug-in locations (13.1) to provide protected plug-in connectors (17) for connection with the connecting lines (30).

15. The electric current supply arrangement in accordance with claim 1, wherein at least one profiled strip (21) with an extending electric current conductor, protected against touching, is arranged in the switchgear cabinet (22) or rack, which is accessible for connection with at least one of the devices to be supplied.

16. The electric current supply arrangement in accordance with claim 1, further comprising several sub-distribution units (11) connectible with each other directly or by pre-fabricated cables, and only one of the sub-distribution units is connected with the main current supply (40).

17. The electric current supply arrangement in accordance with claim 1, wherein at least one of the switchgear cabinet (22) or rack, or the separate cabinet (60) or rack, is provided in the base area or in the roof area at a rear or a front with a cable conduit (50, 51, 52) for the connecting lines (30), and includes a removable cover (52.1) for introducing the connecting lines (30).

18. The electric current supply arrangement in accordance with claim 1, wherein the sub-distribution unit (11) includes a safety device that prevents inserting or pulling out of the sub-distribution unit (11) under an electrical load.

19. The electric current supply arrangement in accordance with claim 1, wherein a receiving socket (17.1) for receiving a plug-in element (17.2) of the consumer connecting line (30) is arranged in a lateral housing wall (11.1) of the sub-distribution unit (11), and a lead-through opening (61.1) for the plug-in element (17.2) is cut into a wall adjoining the cabinet.

* * * * *